(12) United States Patent
Lai et al.

(10) Patent No.: US 12,215,032 B2
(45) Date of Patent: Feb. 4, 2025

(54) FAR INFRARED-EMITTING COMPOSITION AND FAR INFRARED-EMITTING FIBER INCLUDING THE SAME

(71) Applicants: National Chi Nan University, Puli (TW); The Heart of Taiwan Science, Innovation, Culture and Art Co., Ltd., Puli (TW)

(72) Inventors: Long-Li Lai, Taichung (TW); Yan-Chih Lu, Puli (TW); Han-Hsuan Kuo, Puli (TW); Cheng-Hua Lee, Puli (TW)

(73) Assignees: National Chi Nan University, Puli (TW); The Heart of Taiwan Science, Innovation, Culture and Art Co., Ltd., Puli (TW)

( * ) Notice: Subject to any disclaimer, the term of this patent is extended or adjusted under 35 U.S.C. 154(b) by 132 days.

(21) Appl. No.: 17/508,382

(22) Filed: Oct. 22, 2021

(65) Prior Publication Data

US 2022/0333006 A1    Oct. 20, 2022

(30) Foreign Application Priority Data

Apr. 20, 2021 (TW) ................... 110114176

(51) Int. Cl.
| | | |
|---|---|---|
| C01B 33/12 | (2006.01) | |
| C09K 11/02 | (2006.01) | |
| C09K 11/59 | (2006.01) | |

(52) U.S. Cl.
CPC ............. *C01B 33/126* (2013.01); *C09K 11/02* (2013.01); *C09K 11/59* (2013.01)

(58) Field of Classification Search
CPC ........ C09K 11/59; C09K 11/02; C01B 33/126
See application file for complete search history.

(56) References Cited

U.S. PATENT DOCUMENTS

| | | | |
|---|---|---|---|
| 11,795,058 B2 * | 10/2023 | Lai | .................. C01B 33/126 |
| 2019/0055270 A1 | 2/2019 | Lai et al. | |
| 2020/0180967 A1 | 6/2020 | Lai et al. | |

FOREIGN PATENT DOCUMENTS

| | | | |
|---|---|---|---|
| JP | 01-145317 | * | 6/1989 |
| JP | 01-213373 | * | 8/1989 |
| JP | 05-051819 | * | 3/1993 |
| JP | 9-11406 | * | 1/1997 |

OTHER PUBLICATIONS

Geranio et al., The Behavior of Silver Nanotextiles during Washing, Environ. Sci. Technol. 2009, 43, 8113-8118.
Ojstrsek et al., "Washing Durability and Photo-Stability of NanoTiO2—SiO2 Coatings Exhausted onto Cotton and Cotton/Polyester Fabrics," (2019), Coatings, 9:545; doi:10.3390/coatings9090545.

* cited by examiner

*Primary Examiner* — C Melissa Koslow
(74) *Attorney, Agent, or Firm* — Akerman LLP; Peter A. Chiabotti; David Fernandez-Fidalgo

(57) ABSTRACT

A far infrared (FIR)-emitting composition includes a first polymer component and a silicon dioxide composite particle which is prepared by subjecting a tetraalkoxysilane and a compound represented by Formula (A) to hydrolysis and condensation polymerization:

$$Y-Si(OR^a)_3 \qquad (A),$$

wherein each $R^a$ independently represents a $C_{1-4}$ alkyl group or a $C_{1-4}$ alkanoyl group, Y represents $X-R^1-$, a non-substituted $C_{1-18}$ linear alkyl group or a non-substituted $C_{3-18}$ branched alkyl group, and X and $R^1$ are defined as set forth in the Specification and Claims. A FIR-emitting fiber including the FIR-emitting composition is also disclosed.

4 Claims, No Drawings

FAR INFRARED-EMITTING COMPOSITION AND FAR INFRARED-EMITTING FIBER INCLUDING THE SAME

CROSS-REFERENCE TO RELATED APPLICATION

This application claims priority of Taiwanese Invention Patent Application No. 110114176, filed on Apr. 20, 2021.

FIELD

The disclosure relates to a composition and a fiber, and more particularly to a far infrared-emitting composition and a far infrared-emitting fiber.

BACKGROUND

In order to enhance heat production and to keep the human body warm, textile products are conventionally made from a fiber including a polymer component and an inorganic material, e.g., silicon dioxide, which might convert heat energy in the environment into far infrared radiation. The far infrared radiation is able to penetrate into the human body, causing vibration of water molecules so as to generate heat energy.

Yet, it is found that the inorganic material usually does not bond well with the polymer component (with reference to Geranio, L. et al. (2009), Environ. Sci. Technol., 43(21), 8113-8118, and Ojstršek, A., and Fakin, D., (2019), Coatings, 9:545; doi:10.3390/coatings9090545). When the textile products are washed several times, the inorganic material might be separated from the polymer component and might be easily washed away from the textile products, thereby losing the function of generating heat energy.

SUMMARY

Therefore, an object of the disclosure is to provide a far infrared (FIR)-emitting composition and a FIR-emitting fiber that can alleviate at least one of the drawbacks of the prior art.

According to the disclosure, the FIR-emitting composition includes a first polymer component, and a silicon dioxide composite particle which is prepared by subjecting a tetraalkoxysilane and a compound represented by Formula (A), Y—Si(OR$^a$)$_3$ to hydrolysis and condensation polymerization. In Formula (A), each R$^a$ independently represents a C$_{1-4}$ alkyl group or a C$_{1-4}$ alkanoyl group, Y represents X—R$^1$—, a non-substituted C$_{1-18}$ linear alkyl group or a non-substituted C$_{3-18}$ branched alkyl group. For X—R$^1$—, R$^1$ represents a C$_{1-5}$ alkylene group, and X represents

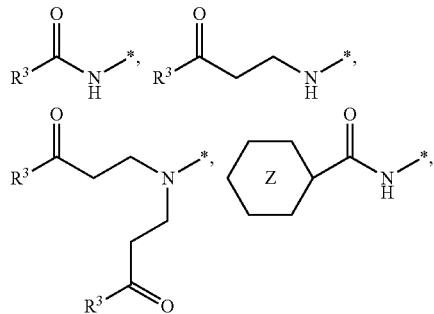

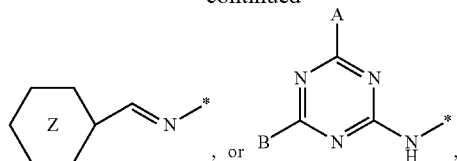

in which each R$^3$ independently represents a non-substituted C$_{1-18}$ linear alkyl or alkoxyl group, or a non-substituted C$_{3-18}$ branched alkyl or alkoxyl group, Z represents a non-substituted phenyl group or a phenyl group substituted by at least one R$^3$, and each of A and B independently represents —NR$^4$R$^5$, —OR$^6$ or —SR$^7$, in which R$^4$ is a hydrogen atom, a non-substituted C$_{1-22}$ linear alkyl group or a non-substituted C$_{3-22}$ branched alkyl group; and each of R$^5$ to R$^7$ independently represents a non-substituted C$_{1-22}$ linear alkyl group or a non-substituted C$_{3-22}$ branched alkyl group.

According to the disclosure, the FIR-emitting fiber includes the abovementioned FIR-emitting composition.

DETAILED DESCRIPTION

The present disclosure provides a far infrared (FIR)-emitting composition which includes a first polymer component and a silicon dioxide composite particle.

There is no special limitation on the material of the first polymer component. Examples of the material of the first polymer component may include, but are not limited to, polyester and nylon. In certain embodiments, the first polymer component includes polyester. An example of the polyester may include, but is not limited to, polyethylene terephthalate (PET).

The silicon dioxide composite particle is prepared by subjecting a tetraalkoxysilane and a compound represented by Formula (A) to hydrolysis and condensation polymerization:

In Formula (A), each R$^a$ may independently represent a C$_{1-4}$ alkyl group or a C$_{1-4}$ alkanoyl group.

In Formula (A), Y may represent X—R$^1$—, a non-substituted C$_{1-18}$ linear alkyl group or a non-substituted C$_{3-18}$ branched alkyl group.

In certain embodiments, Y represents a non-substituted C$_{1-18}$ linear alkyl group or a non-substituted C$_{3-18}$ branched alkyl group. In such case, self-polymerization of the compound represented by Formula (A) can be reduced, so that the stability of the compound can be improved. In an exemplary embodiment, Y represents a non-substituted C$_{1-18}$ linear alkyl group. In another exemplary embodiment, Y represents a non-substituted C$_{2-8}$ linear alkyl group.

In certain embodiments, Y represents X—R$^1$—, i.e., the compound is represented by Formula (A-1), X—R$^1$—Si(OR$^2$)$_3$.

R$^1$ may represent a C$_{1-5}$ alkylene group. X may represent

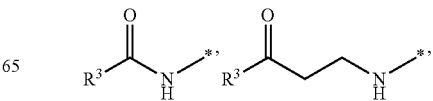

-continued

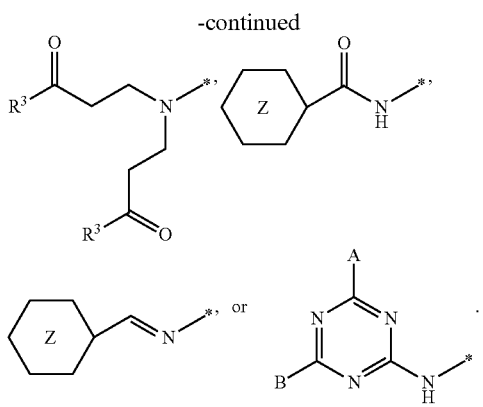

With the abovementioned X group, self-polymerization of the compound represented by formula (A-1) can be reduced, so that the stability of the compound can be improved.

In Formula (A-1), each $R^3$ in X may independently represent a non-substituted $C_{1-18}$ linear alkyl or alkoxyl group, or a non-substituted $C_{3-18}$ branched alkyl or alkoxyl group. In certain embodiments, each $R^3$ may independently represent a non-substituted $C_{2-8}$ linear alkyl or alkoxyl group, or a non-substituted $C_{3-8}$ branched alkyl or alkoxyl group. In other embodiments, each $R^3$ may independently represent a non-substituted $C_{2-8}$ linear alkyl group.

In Formula (A-1), Z may represent a non-substituted phenyl group, or a phenyl group substituted by at least one $R^3$. The at least one $R^3$ may be attached to any available carbon atom on the phenyl ring.

In Formula (A-1), each of A and B may independently represent $—NR^4R^5$, $—OR^6$ or $—SR^7$.

$R^4$ may be a hydrogen atom, a non-substituted $C_{1-22}$ linear alkyl group or a non-substituted $C_{3-22}$ branched alkyl group. In certain embodiments, $R^4$ may be a hydrogen atom, a non-substituted $C_{2-16}$ linear alkyl group or a non-substituted $C_{3-16}$ branched alkyl group. In other embodiments, $R^4$ may be a hydrogen atom, a non-substituted $C_{4-8}$ linear alkyl group or a non-substituted $C_{3-8}$ branched alkyl group.

Each of $R^5$ to $R^7$ may independently represent a non-substituted $C_{1-22}$ linear alkyl group or a non-substituted $C_{3-22}$ branched alkyl group. In certain embodiments, $R^5$ to $R^7$ may independently represent a non-substituted $C_{2-16}$ linear alkyl group or a non-substituted $C_{3-16}$ branched alkyl group. In other embodiments, $R^5$ to $R^7$ may independently represent a non-substituted $C_{2-8}$ linear alkyl group or a non-substituted $C_{3-8}$ branched alkyl group.

It should be noted that the compound represented by Formula (A) or Formula (A-1) has low toxicity and does not cause irritation to skin, and may be prepared by a process disclosed in, e.g. U.S. Patent Application Publication Nos. US 2019/0055270 A1 and US 2020/0180967 A1.

An example of the tetraalkoxysilane may include, but is not limited to, tetraethoxysilane (TEOS).

There is no special limitation on the amount of silicon dioxide composite particle in the FIR emitting composition. In certain embodiments, in order to control the manufacturing cost within a reasonable range, based on a total weight of the FIR-emitting composition, the silicon dioxide composite particle is present in an amount ranging from 1.0 wt % to 50.0 wt %. In other embodiments, the silicon dioxide composite particle is present in an amount ranging from 3.1 wt % to 50.0 wt %, such as 6.0 wt % to 50.0 wt %, so as to prepare a FIR-emitting fabric exhibiting an excellent far infrared emissivity of, e.g., not smaller than 80%.

The present disclosure also discloses a FIR-emitting fiber that includes the above-mentioned FIR-emitting composition. The FIR-emitting fiber may further include a second polymer component. In certain embodiments, the FIR-emitting fiber is prepared by subjecting a blend of the FIR-emitting composition and the second polymer component to a processing procedure. The processing procedure may include, but is not limited to, spinning or melt blowing. In certain embodiments, the processing procedure is spinning. The procedures of spinning have no special limitation, and may be conducted using any well-known technique for preparing textile fibers, such as melt spinning.

There is no special limitation on the material of the second polymer component. The second polymer component may include a material that is identical to or different from that of the first polymer component. Examples of the second polymer component may include, but are not limited to, polyester and nylon. In certain embodiments, the second polymer component includes polyester, such as PET.

In certain embodiments, based on a total weight of the second polymer component and the FIR-emitting polymer composition, the silicon dioxide composite particle is present in an amount ranging from 0.5 wt % to 50.0 wt %. In other embodiments, the silicon dioxide composite particle is present in an amount ranging from 3.1 wt % to 50.0 wt %, so that the resultant FIR-emitting fabric may exhibit a far infrared emissivity of not smaller than 80%.

It is found that the presence of Y group in the compound represented by Formula (A) allows the silicon dioxide composite particle prepared therefrom to have a superior association with the first and second polymer components. Therefore, silicon dioxide composite particle may not be easily separated from the first and second polymer components, and the FIR-emitting fiber may still have a satisfactory far infrared emissivity after multiple washing or laundry cycles.

Examples of the disclosure will be described hereinafter. It is to be understood that these examples are exemplary and explanatory and should not be construed as a limitation to the disclosure.

EXAMPLES

Preparation of Silicon Dioxide Composite Particle 183 g (0.66 mol) of a compound represented by Formula (A), Y—Si(OR$^a$)$_3$ wherein Y represents a non-substituted C$_8$ linear alkyl group, and R$^a$ represents an ethane group (purchased from Ya-Hu-Chi Industrial Co., Catalogue No.: OFS-6341), 2612 g (12.56 mol) of tetraethoxysilane (purchased from XIAMETER, Catalogue No.: OFS-6341) and 3500 mL of ethanol (purchased from Taiwan Sugar Corporation, Catalogue No.:95% refined) were mixed under stirring for 20 minutes to form a mixture. Then, 1800 mL of 35% ammonia solution (purchased from Avantor, Inc., Catalogue No.: JT-9721-05) was slowly added to the mixture and then to be reacted for 24 hours, followed by filtration so as to obtain a filter cake. The filter cake was washed with hot water (approximately 70° C.) twice, and then dried, so as to obtain 1325 g of silicon dioxide composite particle.

Example 1 (E1)

3000 g of polyethylene terephthalate (PET, purchased from Chung Shing Textile Marketing Co., Ltd., Model No.: Semi Dull) serving as a first polymer component and 70 g of silicon dioxide composite particle prepared above were subjected to melting, mixing and granulation processes using a twin screw extruder (produced by HAAKE, Model No.: ZE 25Ax42D), so as to obtain a FIR-emitting composition.

3070 g of the FIR-emitting composition and 3070 g of PET (purchased from Chung Shing Textile Marketing Co., Ltd., Model No.: Semi Dull) serving as a second polymer component (i.e., in a weight ratio of 1:1) were subjected to the melting, mixing and granulation processes, and then dried in an environment having a temperature of 115° C. for 8 hours. The thus obtained dried product was subjected to melt spinning at 288° C. under a spinning speed of 700 m/min so as to obtain a semi-product. The semi-product was then subjected to a stretching treatment at 110° C. and at a stretching ratio of 2.2 so as to obtain a FIR-emitting fiber of E1. Afterwards, the FIR-emitting fiber was subjected to a knitting process, so as to obtain a FIR-emitting fabric (a gauge of 18 stitches per inch) of E1.

Examples 2 and 3 (E2 and E3)

The FIR-emitting compositions, the FIR-emitting fibers and the FIR-emitting fabrics used in E2 and E3 were generally prepared using procedures similar to those conducted in E1, except that the amount of silicon dioxide composite particles used to prepare FIR-emitting composition in E2 and E3 were varied as shown in Table 1.

TABLE 1

| | | E1 | E2 | E3 |
|---|---|---|---|---|
| FIR-emitting composition | First polymer component (PET) (g) | 3000 | 3000 | 3000 |
| | Silicon dioxide composite particle (g) | 70 | 80 | 200 |
| | (wt %) | 2.28 | 2.60 | 6.25 |
| FIR-emitting fiber | FIR-emitting composition (g) | 3070 | 3080 | 3200 |
| | Second polymer component (PET) (g) | 3070 | 3080 | 3200 |
| | Silicon dioxide composite particle (wt %) | 1.14 | 1.30 | 3.13 |

Property Evaluations
Measurement of Far Infrared Emissivity (%)

Each of the FIR-emitting fabrics (in a length of approximately 300 mm and a width of approximately 900 mm) of E1 to E3 was subjected to measurement of far infrared emissivity using a far infrared spectrophotometer at room temperature under a measuring wavelength ranging from 2 μm to 22 μm according to the procedures set forth in the Specified Requirements of Far Infrared Textiles FTTS-FA-010-2007 4.1. The results are shown in Table 2.
Measurement of Temperature Rise (° C.)

Each of the FIR-emitting fabrics (in a length of approximately 300 mm and a width of approximately 900 mm) of E1 to E3 was subjected to irradiation from a halogen lamp (a power of 500 W, serving as a heat source and placed at a distance of 100 cm away therefrom) for 10 minutes. The temperature rise of each of the FIR-emitting fabrics was determined using a temperature rise monitoring device (produced by Thermovision) according to the procedures set forth in Specified Requirements of Far Infrared Textiles FTTS-FA-010-2007 4.1. The results are shown in Table 2.
Washing Test Each of the FIR-emitting fabrics (in a length of approximately 300 mm and a width of approximately 900 mm) of E1 to E3 was subjected to 20 laundry cycles using a washing machine (produced by Kenmore, Model No.: 80 Series). The FIR-emitting fabrics were then subjected to the aforementioned measurement of far infrared emissivity and measurement of temperature rise. The results are shown in Table 2.

TABLE 2

| | | E1 | E2 | E3 |
|---|---|---|---|---|
| Before washing | Far infrared emissivity (%) | 73 | 77 | 82 |
| | Temperature rise (° C.) | 4.10 | 4.50 | 5.02 |
| After 20 laundry cycles | Far infrared emissivity (%) | 71 | 75 | 80 |
| | Temperature rise (° C.) | 4.00 | 4.30 | 5.05 |

Referring to Table 2, each of the FIR-emitting fabrics of E1 to E3 shows a remarkable far infrared emissivity and effectively induces temperature rise before washing. After 20 laundry cycles, the FIR-emitting fabrics of E1 to E3 are capable of retaining a similar performance of far infrared emissivity and temperature rise. This result indicates that the silicon dioxide composite particle exhibits a strong association with the first and second polymer components, and does not easily separate therefrom after multiple washing or laundry cycles.

In addition, the FIR-emitting fabric of E3, in which the silicon dioxide composite particle is present in an amount of 3.10 wt % based on a total weight of the second polymer component and the FIR-emitting polymer composition, is capable of exhibiting an improved far infrared emissivity of not less than 80% before washing and even after multiple washing.

To conclude, since the silicon dioxide composite particle is prepared from the compound represented by Formula (A) which has the Y group capable of forming a strong association with the first and second polymer components, the silicon dioxide composite particle is less prone to separation from the polymer components, and the FIR-emitting fiber and FIR-emitting fabric produced therefrom can retain a superior far infrared emissivity and ensure a sufficient temperature rise after repeated washing.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A far infrared (FIR)-emitting fiber, comprising a FIR-emitting composition, which includes:
a first polymer component; and
a silicon dioxide composite particle which is prepared by subjecting a tetraalkoxysilane and a compound represented by Formula (A) to hydrolysis and condensation polymerization, Y—Si(OR$^a$)$_3$ (A), wherein
each R$^a$ independently represents a C$_{1-4}$ alkyl group or a C$_{1-4}$ alkanoyl group;
Y represents X-R$^1$, wherein
R$^1$ represents a C$_{1-5}$ alkylene group; and
X represents

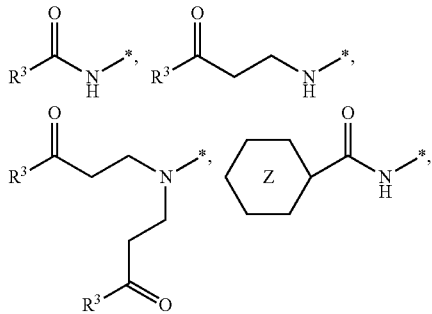

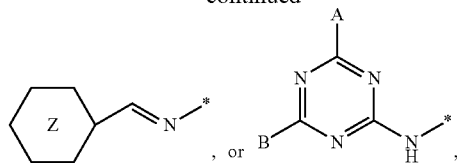

wherein each R$^3$ independently represents a non-substituted C$_{2-8}$ linear alkyl or alkoxyl group, or a non-substituted C$_{3-8}$ branched alkyl or alkoxyl group;
Z represents a non-substituted phenyl group or a phenyl group substituted by at least one R$^3$; and
each of A and B independently represents —NR$^4$R$^5$, —OR$^6$ or —SR$^7$, in which R$^4$ is a hydrogen atom, a non-substituted C$_{1-22}$ linear alkyl group or a non-substituted C$_{3-22}$ branched alkyl group; and each of R$^5$ to R$^7$ independently represents a non-substituted C$_{1-22}$ linear alkyl group or a non-substituted C$_{3-22}$ branched alkyl group;
the FIR-emitting fiber further comprising a second polymer component,
wherein based on a total weight of said second polymer component and said FIR-emitting composition, said silicon dioxide composite particle is present in an amount ranging from 0.5 wt % to 50.0 wt %.

2. The FIR-emitting fiber of claim 1, wherein each R$^3$ independently represents a non-substituted C$_{2-8}$ linear alkyl group.

3. The FIR-emitting fiber of claim 1, wherein said tetraalkoxysilane is tetraethoxysilane.

4. The FIR-emitting fiber of claim 1, wherein said first polymer component includes polyester.

* * * * *